(12) United States Patent
Gore

(10) Patent No.: US 11,400,345 B2
(45) Date of Patent: Aug. 2, 2022

(54) ROWING MACHINE HAVING A HANDLE WITH A CURSOR CONTROL DEVICE FOR CONTROLLING A CURSOR AT A GRAPHICAL USER INTERFACE

(71) Applicant: Recreation Supply, Inc., Lewis Center, OH (US)

(72) Inventor: Alan Gore, Lewis Center, OH (US)

(73) Assignee: Recreation Supply, Inc., Lewis Center, OH (US)

( * ) Notice: Subject to any disclaimer, the term of this patent is extended or adjusted under 35 U.S.C. 154(b) by 106 days.

(21) Appl. No.: 16/594,142

(22) Filed: Oct. 7, 2019

(65) Prior Publication Data
US 2021/0101052 A1 Apr. 8, 2021

(51) Int. Cl.
| | |
|---|---|
| G06F 3/048 | (2013.01) |
| A63B 24/00 | (2006.01) |
| G06F 3/0338 | (2013.01) |
| G06F 3/0354 | (2013.01) |
| G06F 3/0488 | (2022.01) |
| G06F 3/0482 | (2013.01) |
| G06F 3/04817 | (2022.01) |
| A63B 21/00 | (2006.01) |
| A63B 22/00 | (2006.01) |

(Continued)

(52) U.S. Cl.
CPC ...... *A63B 24/0087* (2013.01); *A63B 21/4035* (2015.10); *A63B 22/0076* (2013.01); *A63B 71/0622* (2013.01); *G06F 3/0338* (2013.01); *G06F 3/03547* (2013.01); *G06F 3/03549* (2013.01); *G06F 3/048* (2013.01); *G06F 3/0482* (2013.01); *G06F 3/0488* (2013.01); *G06F 3/04817* (2013.01); *G06F 3/04847* (2013.01); *A63B 2071/0658* (2013.01); *A63B 2071/0675* (2013.01); *A63B 2225/50* (2013.01)

(58) Field of Classification Search
None
See application file for complete search history.

(56) References Cited

U.S. PATENT DOCUMENTS

| 4,630,817 A | 12/1986 | Buckley |
|---|---|---|
| 5,362,069 A | 11/1994 | Hall-Tipping |

(Continued)

FOREIGN PATENT DOCUMENTS

| CN | 202699974 U | * | 1/2013 | ............ A63B 24/00 |
|---|---|---|---|---|
| CN | 202699974 U | | 1/2013 | |

OTHER PUBLICATIONS

Bodycraft, VR500 Pro Rowing Machine, Aug. 28, 2019, pp. 1-8, USA https://www.bodycraft.com/vr500-pro-rowing-machine.html.

(Continued)

*Primary Examiner* — Xuyang Xia
(74) *Attorney, Agent, or Firm* — Standley Law Group, LLP; Jeffrey Standley; Adam Smith

(57) ABSTRACT

A handle for a rowing machine is provided. The handle has a cursor control device which accepts user input. A processor is in electronic communication with the cursor control device and an electronic display. An electronic storage device comprises executable software instructions, which when executed, configure the processor to receive user input from the cursor control device and move the cursor on a graphical user interface ("GUI") in response to the received user input or update the GUI based on user input.

20 Claims, 6 Drawing Sheets

(51) Int. Cl.
    *A63B 71/06*         (2006.01)
    *G06F 3/04847*    (2022.01)

(56) References Cited

U.S. PATENT DOCUMENTS

| | | | |
|---|---|---|---|
| 7,837,595 | B2 | 11/2010 | Rice |
| 10,471,297 | B1* | 11/2019 | Smith ................ A63B 22/0087 |
| 2002/0055419 | A1* | 5/2002 | Hinnebusch ........... G16H 40/67 |
| | | | 482/8 |
| 2007/0123390 | A1 | 5/2007 | Mathis |
| 2007/0281828 | A1* | 12/2007 | Rice ..................... A63F 13/245 |
| | | | 482/4 |
| 2014/0066201 | A1 | 3/2014 | Huang et al. |
| 2017/0014669 | A1 | 1/2017 | Hall |
| 2017/0361153 | A1* | 12/2017 | Machovina .......... A63B 21/153 |
| 2018/0056111 | A1* | 3/2018 | Chiang ............. A63B 71/0619 |
| 2018/0114010 | A1* | 4/2018 | Van Os ................. H04W 12/06 |
| 2018/0256961 | A1 | 9/2018 | Shi et al. |
| 2019/0099649 | A1* | 4/2019 | Machovina ........... A63B 69/06 |
| 2019/0126099 | A1* | 5/2019 | Hoang .................. A63F 13/798 |

OTHER PUBLICATIONS

The Hydro, Rowing Reimagined A state-of-the-art rowing machine designed to transform the way you work out, Aug. 27, 2019, pp. 1-8, USA https://hydrow.com/the-hydrow.

Bodycraft, VR500 Pro Rowing Machine, Sep. 15, 2020, pp. 1-7, USA https://web.archive.org/web/20150602143228/https://www.bodycraft.com.

* cited by examiner

ROWING MACHINE HAVING A HANDLE WITH A CURSOR CONTROL DEVICE FOR CONTROLLING A CURSOR AT A GRAPHICAL USER INTERFACE

CROSS-REFERENCE TO RELATED APPLICATIONS

This application is a makes no priority claim.

TECHNICAL FIELD

Exemplary embodiments relate generally to a rowing machine having a handle with a cursor control device for controlling a cursor for a graphical user interface ("GUI").

BACKGROUND AND SUMMARY OF THE INVENTION

Rowing machines are popular exercise devices which simulate a real-world rowing motion to provide both a strength and cardiovascular workout. Rowing machines are known to incorporate a variety of features, including displays with user interfaces. Such user interfaces may be configured to display workout information, workout videos, games, and the like to provide the user with feedback regarding his or her workout or to increase user engagement. The HYDROW™ (https://hydrow.com/) is a rowing machine with a large display which is configured to provide simulated workout classes and a simulated real-world rowing experience with a user interface.

User operation of the displays and user interfaces associated with exercise machines is difficult because the user is typically in constant motion when performing a workout. With a rowing type exercise, the user is typically in constant motion towards or away from a display, which makes operation especially difficult. However, user input is generally required to utilize certain features. For example, user input is generally required to change the workout parameters (time, resistance, etc.), select a new workout routine, and the like. To provide such input, a user may be required to pause his or her workout to make the appropriate changes.

It is known to provide a rowing handle containing buttons which operate a menu-driven user interface. For example, the VR500 PRO ROWING MACHINE from BODYCRAFT™ provides such a handle for operating a menu-driven user interface (https://www.bodycraft.com/vr500-pro-rowing-machine.html). However, as user interfaces become more complex, they often require the user to control a cursor to make certain selections. Therefore, what is needed is a rowing machine handle with a cursor control device for a user interface.

A rowing machine handle with a cursor control device for a user interface is provided. The cursor control device may comprise, for example without limitation, a touch pad, a joystick, or a ball. Movement or selection at the cursor control device may be translated into movement or selection of a cursor at a GUI. The GUI may be displayed on an electronic display mounted to the rowing machine. The GUI may comprise a number of icons. The icons may each be associated with one or more options or features, which may include workout parameters, content to be displayed, some combination thereof, or the like. The GUI and/or various settings of the rowing machine may be updated based on user movement or selection received at the cursor control device. In this way, the user's workout does not be interrupted to interact with the GUI. Content may be downloaded or streamed to the GUI by way of a network. Likewise, user information may be uploaded and stored offsite.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
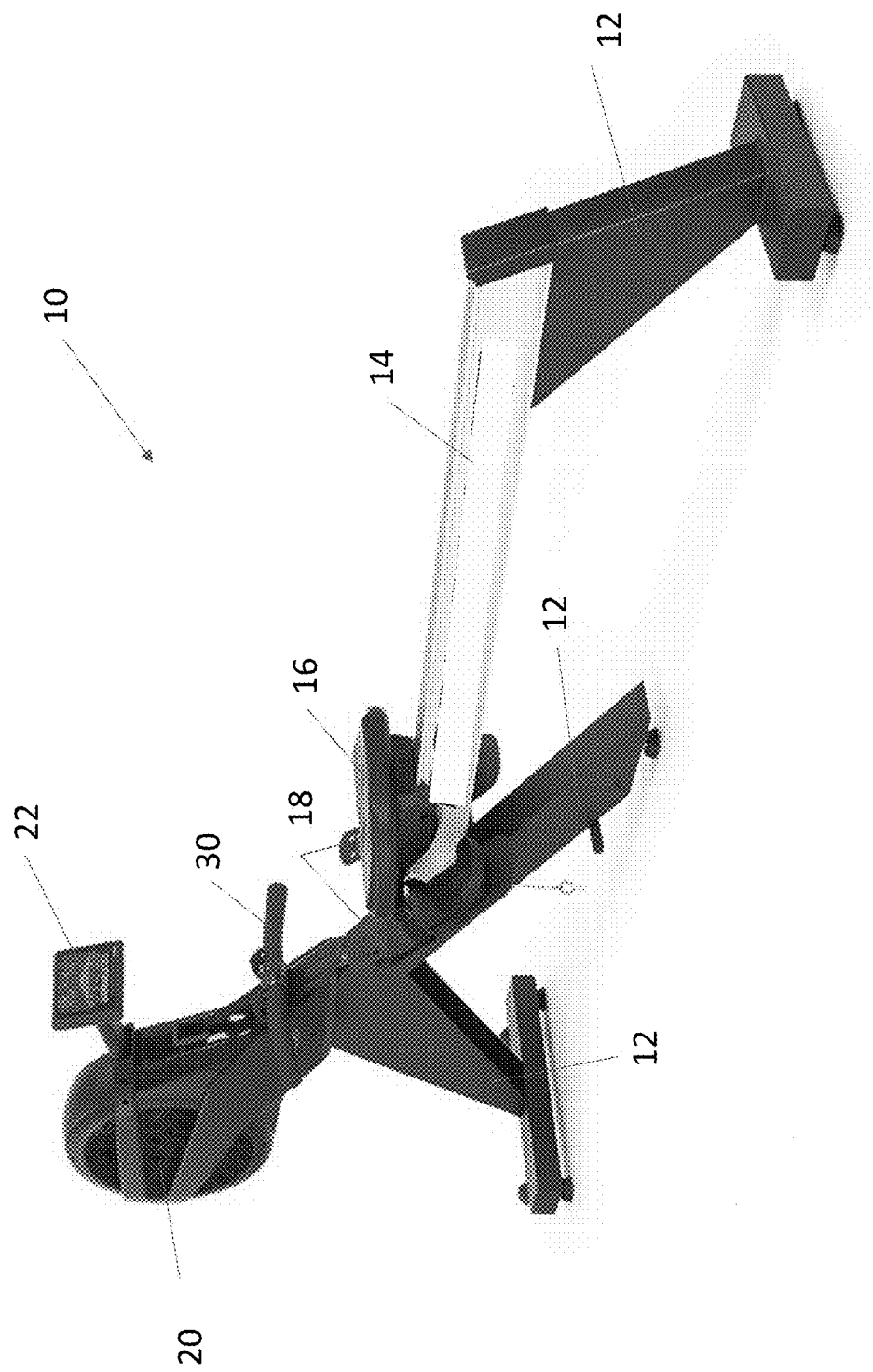
FIG. 1 is a perspective view of an exemplary rowing machine.

FIG. 1 illustrates an exemplary rowing machine 10. The rowing machine 10 may comprise one or more supports 12. The supports 12 may be configured to extend from the ground or another surface. A track 14 may extend between one or more of the supports 12. The track 14 may support a seat 16 in a sliding arrangement such that the seat 16 may be moved along the track 14, thereby permitting the user to perform a rowing motion. Foot securing devices 18 may be located on one or more of the supports 12. The foot securing devices 18 may be configured to accommodate the feet of a user and secure them so that the user can drive his or her body forward and backwards along the track 14 to perform the rowing motion. A resistance device 20 may be mounted to one or more of the supports 12. The resistance device 20 may be configured to provide resistance to a handle 30 attached thereto. The resistance device 20 may be configured to provide an adjustable amount of resistance to the handle 30. The resistance device 20 may comprise a fan, a magnetic device, water, some combination thereof, or the like. A connector 36 may extend between the handle 30 and the resistance device 20. The connector 36 may be a chain, rope, cable, some combination thereof, or the like.

Figure 2:
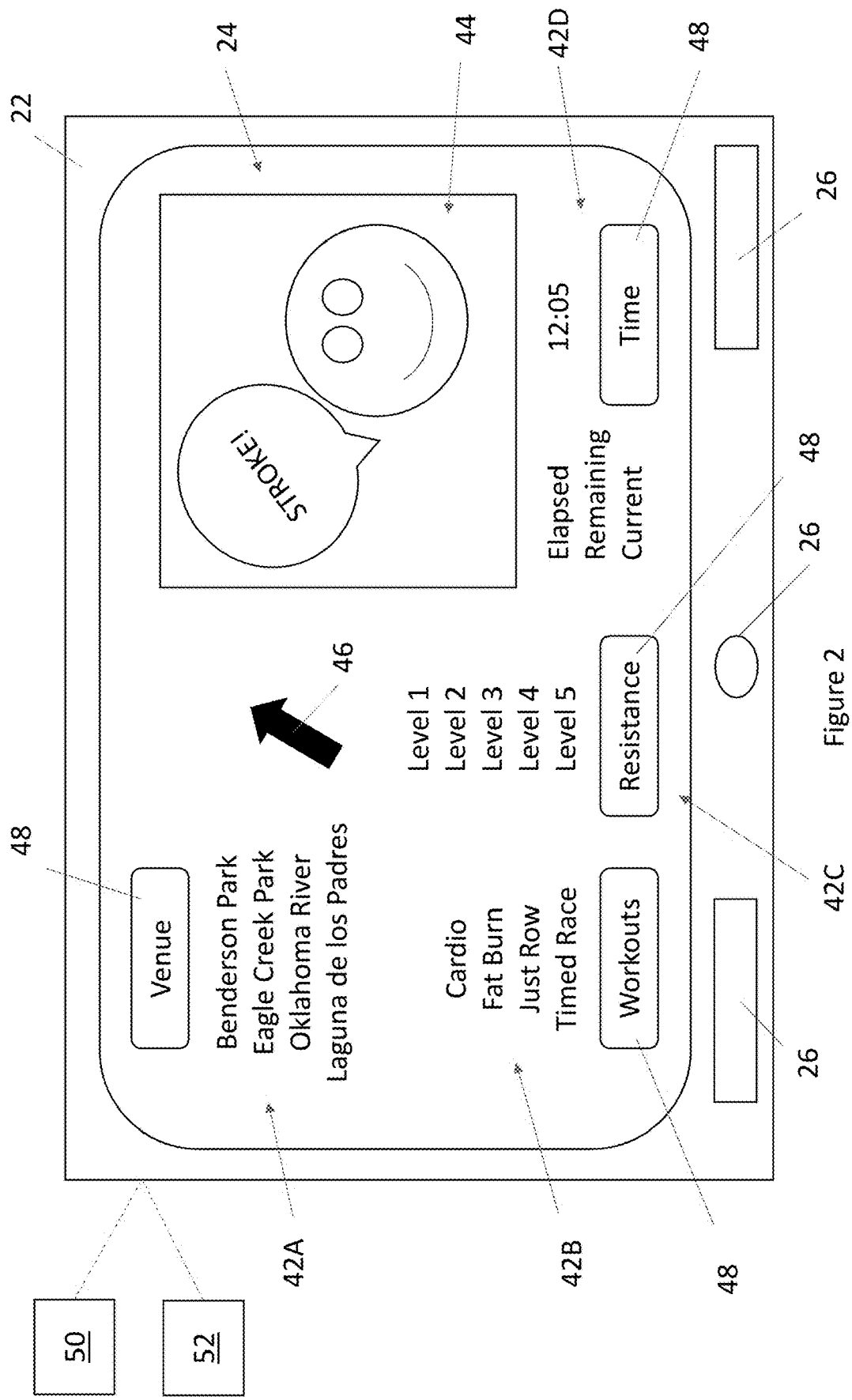
FIG. 2 is a detailed front view of an exemplary electronic display and GUI for the rowing machine of FIG. 1.

FIG. 2 illustrates an exemplary GUI 24 for an electronic display 22. The electronic display 22 may be mounted to one or more of the supports 12. In exemplary embodiments, the electronic display 22 is mounted to face the seat 16 such that it is visible to the user while the user is performing the rowing motion. The electronic display 22 may be a liquid crystal display ("LCD"), cathode ray tube, projection, light emitting diode ("LED"), plasma, organic LED, type display, some combination thereof, or the like. Any size, shape, and number of electronic displays 22 are contemplated. The electronic display 22 may comprise one or more peripheral items 26. Such peripheral items 26 may include, for example without limitation, speakers, heart rate monitors, accessory input devices, cameras, microphones, fans, some combination thereof, or the like. Alternatively, or additionally, some or all of such peripheral items 26 may be located elsewhere on the rowing machine 10.

The electronic display 22, or other part of the rowing machine 10, may comprise a network connectivity device 28. The network connectivity device 28 may be configured to electronically communicate with one or more remote devices by way of a network such as, but not limited to, an internet, intranet, the world wide web, a cellular network, some combination thereof, or the like. The network connectivity device 28 may be configured to facilitate download and/or streaming of content. Such content may include, for example without limitation, workout videos, interactive scenery, simulated workout classes, some combination thereof, or the like. Any type of content is contemplated. Alternatively, or additionally, the network connectivity device 28 may be configured to facilitate remote storage of user preferences, workout goals, workout history, some combination thereof, or the like.

The GUI 24 may be configured to display one or more options or features and accept user input. The GUI 24 may be configured to display workout information including, for example without limitation, distance rowed, rowing speed, resistance level, current time, elapsed time, remaining time, some combination thereof, or the like. The GUI 24 may be configured to display content including, for example without limitation, workout videos, exercise instructions, games, interactive content, other videos or images, some combination thereof, or the like. The GUI 24 may be configured to display one or more prompts configured to receive user input including, for example without limitation, selection of various setting. Such setting may include, for example without limitation, workout type, resistance levels, time, venue, display setting, user preferences, audio options, some combination thereof, or the like. These examples are intended to be illustrative and not limiting, those of skill in the art will recognize that any type of information may be provided on the GUI 24 and type of user input may be received at the GUI 24.

In exemplary embodiments, the GUI 24 may be configured to display a cursor 46 which permits the user to provide input. For example, without limitation, the cursor 46 may be controlled by the user and may be used to select various content for display or setting. Such selections may be made by way of one or more icons 48 displayed on the GUI 24. The number, type and arrangement of such icons 48 is contemplated. Any number, type, format, arrangement, orientation, and structure of the icons 48 is contemplated. The type of content to be displayed on the GUI 24 is merely exemplary and is not intended to be limiting. Any content is contemplated.

For example, without limitation, the GUI 24 may comprise one or more interactive areas 42A-42D. A first interactive area 42A may permit the user to select one of a number of venues. A second interactive area 42B may permit the user to select one of a number of workouts. A third interactive area 42C may permit the user to select one of a number of resistance levels. A fourth interactive area 42D may permit the user to select one of a number of times for display. The GUI 24 may, alternatively or additionally, comprise one or more display areas 44. A display area 44 may be configured to display various selected information, images, or videos. The illustrated number, type, arrangement, and content of the interactive areas 42A-42D and display area 44 is merely exemplary and is not intended to be limiting. Any number, type, arrangement, and content of the interactive areas 42A-42D and display area 44 is contemplated. Each of the interactive area 42A-42D may display one or more options or features for selection. The options or features may be displayed in any format, arrangement, or fashion such as in windows, scrolling, pop ups, fans, some combination thereof, or the like.

User selection at the GUI may be made by way of a cursor 46. The cursor 46 may be an electronically displayed arrow, hand, dot, circle, shape, finger, pointer, some combination thereof, or the like. The user may navigate the cursor 46 to correspond with a particular selection of an interactive area 42A-42D and make a selection input to select the corresponding item. The GUI 24 may be configured to monitor for user selection of one or more of the options or features may be configured to update the content displayed at the GUI 24 and/or update various settings for the rowing machine 10 based on such selections. For example, without limitation, the resistance level of the resistance device 20 may be adjustably controlled by the GUI 24.

Figure 3:
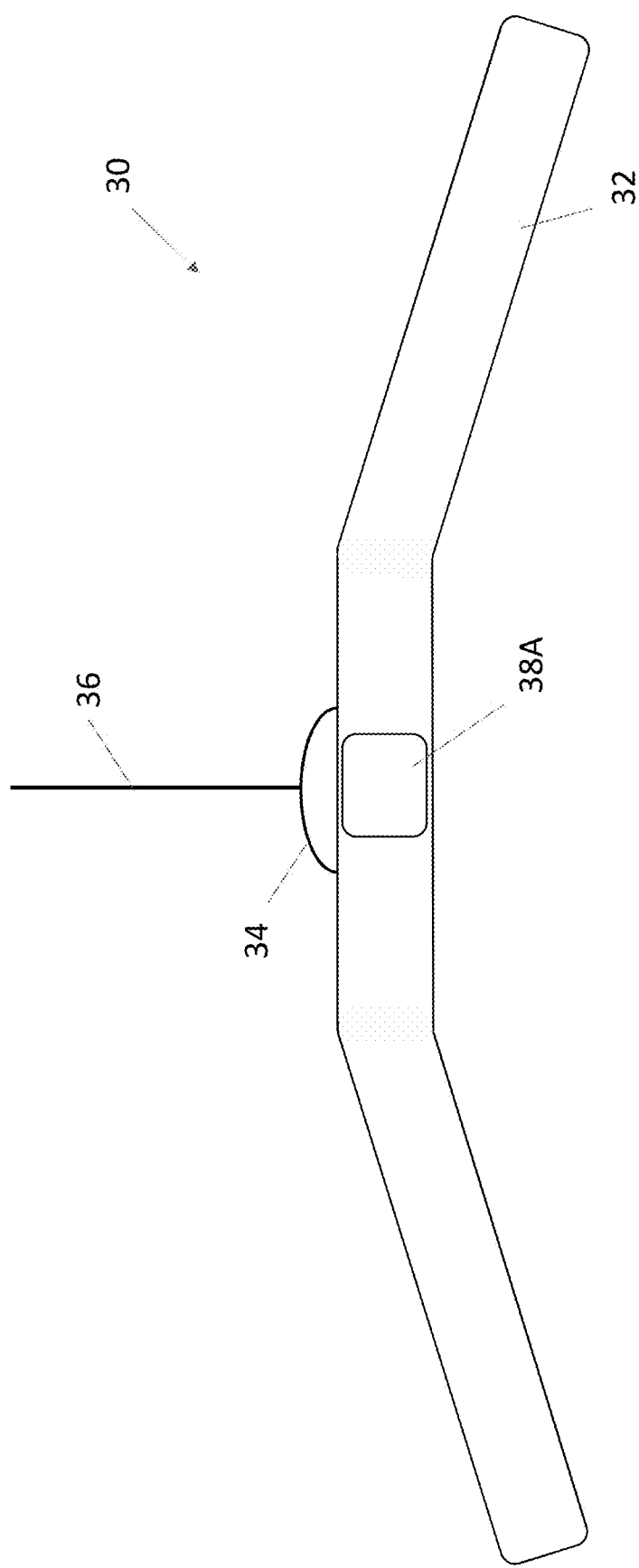
FIG. 3 is a top perspective view of an exemplary handle for the rowing machine of FIG. 1.
Figure 5:
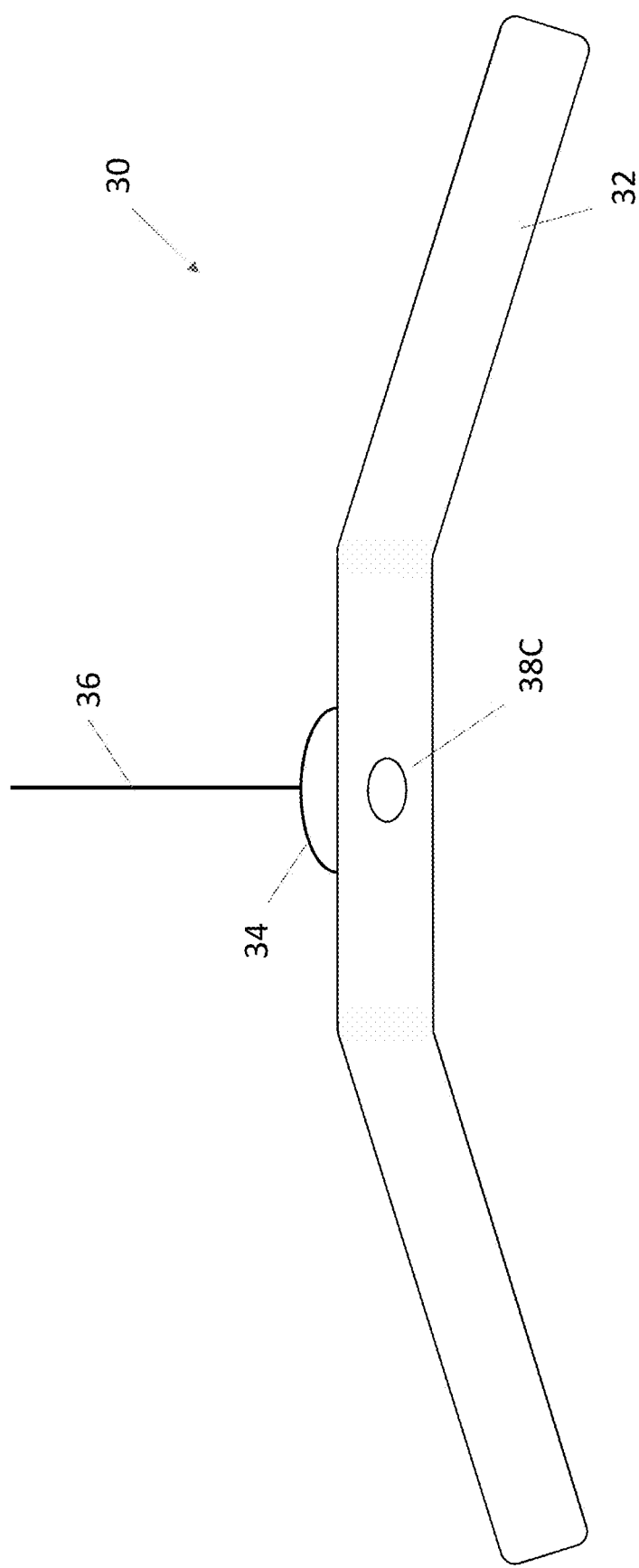
FIG. 5 is top perspective view of another exemplary handle for the rowing machine of FIG. 1.

FIG. 3 though FIG. 5 illustrate various embodiments of the handle 30. The handle 30 may comprise a grip area 32. The grip area 32 may be any size or shape. The grip area 32 may be configured to provide an area for the user to grasp the handle 30 while performing the rowing motion. An attachment device 34 may be located at substantially the middle of the grip area 32, though any location is contemplated. The attachment device 34 may comprise a ring, hoop, hook, carabiner, some combination thereof, or the like. The attachment device 34 may facilitate the selective attachment of the connector 36 to the handle 30. Alternatively, or additionally, the connector 36 may be permanently connected to the handle 30. Alternatively, the connector 36 may be connected directly to the grip area 32.

A cursor control device 38 may be located on, or adjacent to, the grip area 32. In exemplary embodiments, the cursor control device 38 may be located at substantially the middle of the grip area 32, though any location is contemplated. The cursor control device 38 may be configured to permit user interaction with the cursor 46 on the GUI 24 of the electronic display 22.

Figure 4:
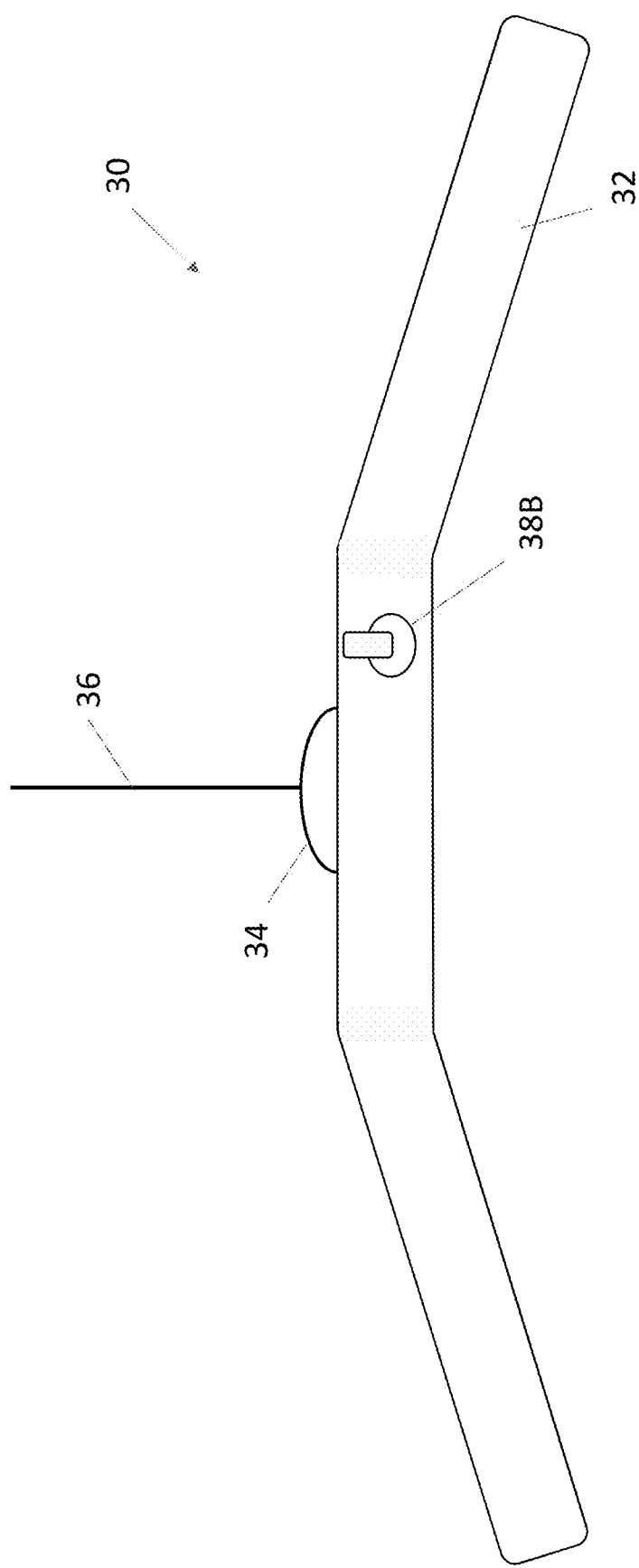
FIG. 4 is top perspective view of another exemplary handle for the rowing machine of FIG. 1.

As illustrated particularly in FIG. 3, the cursor control device 38 may comprise a touch pad 38A. Touch input or gestures at the touch pad 38A may be translated into movements or selections at the GUI 24. As illustrated particularly in FIG. 4, the cursor control device 38 may comprise a joystick 38B. Touch input or gestures at the joystick 38B, including by movement of the joystick and/or actuation of buttons located thereon, may be translated into movements or selections at the GUI 24. As illustrated particularly in FIG. 5, the cursor control device 38 may comprise a ball 38C. Movement and/or depression of the ball 38C may be translated into movements or selections at the GUI 24. These cursor control devices 38 are merely exemplary and are not intended to be limiting. Any type of cursor control device 38 is contemplated. As shown with particular respect to FIG. 4, the cursor control device 38 may be located right of center to better accommodate right-handed users. Alternatively, the cursor control device 38 may be located left of center to better accommodate left-handed users. Alternatively, or additionally, a pair of cursor control devices may be located right and left of center to accommodate right- and left-handed users or the ability to use either hand. Any number, type, and arrangement of the cursor control devices 38 is contemplated.

The cursor control device 38 may be configured to receive user input and translate certain user movements or gestures on the cursor control device 38 into corresponding movements on the GUI 24. For example, without limitation, upward movement at the cursor control device 38 may be shown as upward movement of the cursor 46, rightward movement at the cursor control device 38 may be shown as rightward movement of the cursor 46, and the like. As another example, without limitation, tapping, depressing, or otherwise actuation the cursor control device 38 may correspond to a selection input at the GUI 24. These movements and gestures are merely exemplary and are not intended to be limiting. Any type of movement or gesture may be translated into any particular action on the GUI 24.

Figure 6:
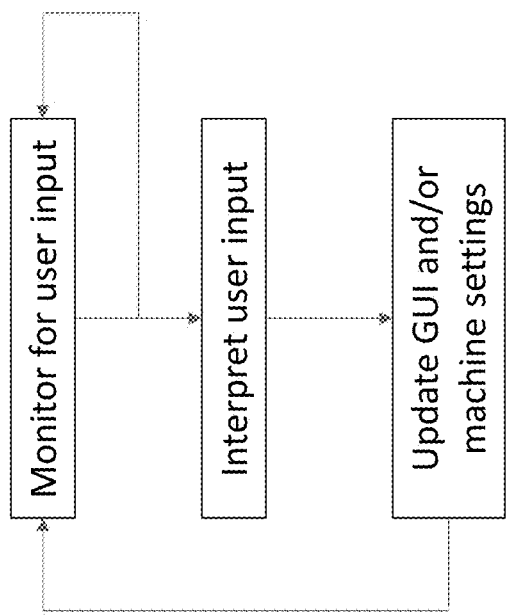
FIG. 6 is a flowchart with exemplary logic for updating the GUI and/or machine settings based on user input.

FIG. 6 is a flowchart with exemplary logic for updating the GUI 24 based on user input received at the cursor control device 38. The rowing machine 10 may comprise one or more processors 50 and one or more electronic storage devices 52. The processor 50 may be in electronic communication with the electronic storage device 52, the cursor control device 38 of the handle 30, and the electronic display 22. The processor 50 may be in electronic communication with one or more additional components of the rowing machine 10 including, for example without limitation, the resistance device 20 and the peripheral devices 26. The electronic storage device 52 may comprise one or more software instructions, which when executed by the processor 52 configure the processor 52 to monitor for user input at the cursor control device 38. Upon receipt of user input, the user input may be interpreted and corresponding updates may be made at the GUI 24. Such updates may include, for example without limitation, movement of the cursor 46, selection or one or more options or features which may be translated to updated workout information, images, videos, games, or the like. Alternatively, or in addition, various parameters and settings may be updated based on receipt of such user input. Such parameters and settings may include, for example without limitation, increase or decrease of resistance levels provided at the resistance device 20, control of the peripheral device 26 (for example, without limitation, play or volume of audio, activation or deactivation of camera or microphone, fan levels, some combination thereof, or the like).

While discussion is made regarding a single processor 50 and a single electronic storage device 52, those of skill in the arts will recognize that multiple processors 50 and/or multiple electronic storage devices 52 could be utilized. The cursor control device 38 may be in wired or wireless connection with the processor 50.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphone, tablets, databases, servers, or the like. The electronic connections described herein may be accomplished by wired or wireless means.

What is claimed is:

1. A rowing machine comprising:
   supports;
   a track extending between at least two of the supports;
   an electronic display connected to at least one of the supports or said track;
   a resistance device connected to the at least one of the supports, another one of the supports, or said track;
   a handle comprising:
      a grip area; and
      a cursor control device configured to receive user input;
   a flexible connector extending between the handle and the resistance device;
   one or more processors; and
   one or more electronic storage devices comprising software instructions, which when executed, configure the one or more processors to:
      present a graphical user interface ("GUI") comprising interactive areas at the electronic display;
      display a cursor at the GUI;
      receive data from the cursor control device indicating user input received at the cursor control device;
      in accordance with at least some of the received data, move the cursor at the GUI; and
      in accordance with at least some other of the received data, indicate selection of one of the interactive areas at the GUI and update operations of the resistance device in accordance with the selection;
   wherein the handle is independently moveable relative to the electronic display and is connected to the resistance device in a manner which provides resistance to movement of said handle during a rowing exercise movement.

2. The rowing machine of claim 1 wherein:
   the cursor control device comprises at least one of: a touch pad, a joystick, and a ball.

3. The rowing machine of claim 1 wherein:
   said cursor comprises an electronically displayed icon; and
   said cursor control device configured to receive user input for translation to movement of the electronically displayed icon at the GUI in an unconstrained manner within an entirety of the GUI.

4. The rowing machine of claim 1 wherein:
said cursor control device is wirelessly connected to said one or more processors.

5. The rowing machine of claim 1 further comprising:
a peripheral device, wherein selection of at least one of said interactive areas is configured to modify operations of said peripheral device.

6. A rowing machine comprising:
supports;
a track extending between at least two of the supports;
a seat slidably mounted to said track;
a resistance device connected to at least one of said supports and said track;
an electronic display connected to at least one of said supports and said track;
a flexible connector;
a handle connected to the resistance device by way of the flexible connector, wherein the resistance device is configured to provide physical resistance to movement of the handle by a user during a rowing exercise motion, said handle comprising a cursor control device provided at the handle in a manner physically accessible for direct physical touch by the user and configured to accept user input during the rowing exercise motion, wherein said rowing exercise motion includes independent movement of the handle relative to the electronic display;
at least one processor in electronic communication with the cursor control device and the electronic display by wired or wireless connection; and
at least one electronic storage device comprising executable software instructions, which when executed, configure the at least one processor to:
generate a graphical user interface ("GUI") at the electronic display, wherein said GUI comprises a cursor and settings;
receive the user input from the cursor control device;
move the cursor of the GUI in response to at least some of the received user input;
update at least one of the settings in response to at least some other of the received user input; and
operate the rowing machine in accordance with the updated at least one of the settings;
wherein the handle is independently moveable relative to the electronic display.

7. The rowing machine of claim 6 wherein:
the cursor control device comprises a touch pad; and
the at least one electronic storage device comprises additional executable software instructions, which when executed, configure the at least one processor to translate movement of an appendage of the user at the touch pad into corresponding movement of the cursor at the GUI and tapping of the appendage at the touch pad into selection of a particular one of the settings at the GUI corresponding with a location of the cursor as displayed at the GUI upon said tapping.

8. The rowing machine of claim 6 further comprising:
additional executable software instructions stored at the at least one electronic storage device, which when executed, configure the at least one processor to modify content displayed at the GUI in response to at least some of the received user input.

9. The rowing machine of claim 6 wherein:
the settings comprise a resistance level setting; and
the at least one electronic storage device comprises additional executable software instructions, which when executed, configure the at least one processor to adjust resistance provided at the resistance device in response to certain of the received user input indicating modification of the resistance level setting.

10. The rowing machine of claim 6 wherein:
the GUI comprises a display area configured to display video content.

11. The rowing machine of claim 10 further comprising:
a network connectivity device in electronic communication with said at least one electronic storage device; and
additional executable software instructions stored at the at least one electronic storage device, which when executed, configure the at least one processor to download said video content for display, and display said downloaded video content at said display area.

12. The rowing machine of claim 6 wherein:
the cursor control device comprises a joystick; and
the at least one electronic storage device comprises additional executable software instructions, which when executed, configure the at least one processor to translate movement of the joystick into corresponding movement of the cursor at the GUI.

13. The rowing machine of claim 6 wherein:
the cursor control device comprises a ball; and
the at least one electronic storage device comprises additional executable software instructions, which when executed, configure the at least one processor to translate movement of the ball into corresponding movement of the cursor at the GUI.

14. The rowing machine of claim 6 wherein:
the cursor control device is located at a middle portion of the handle.

15. The rowing machine of claim 6 wherein:
said software instructions are configured to, when executed, permit movement of the cursor within an entirety of the GUI.

16. A rowing machine comprising:
one or more supports;
a track connected to said one or more supports;
a seat mounted to said track in a sliding fashion;
a resistance device connected to at least one of said one or more supports;
a handle connected to said resistance device in a manner which permits movement of the handle independent of said one or more supports and relative to the resistance device by a user seated at the seat and performing a rowing exercise movement, said handle comprising:
an attachment device;
a grip area; and
a touch pad configured to accept user input representing movement of a cursor or selection while performing said rowing exercise movement;
a flexible connector connecting said handle to said resistance device so as to provide physical resistance to said movement of the handle by said user as part of said rowing exercise movement, wherein said attachment device is configured to facilitate attachment of the flexible connector to the handle;
an electronic display connected to at least one of said one or more supports and configured to display a graphical user interface ("GUI") comprising a cursor, a display area, and a number of interactive areas, each associated with at least one of a number of options, wherein at least a portion of said number of options are associated with resistance levels for said resistance device;

one or more processors in electronic communication with the touch pad and the electronic display; and one or more electronic storage devices comprising executable software instructions, which when executed, configure the one or more processors to:

display video content at said display area;

display said number of options at said number of interactive areas;

receive user input from the touch pad representing movement of an appendage of the user at the touch pad;

move the cursor at the GUI in response to the received user input;

receive additional user input from the touch pad representing selection of a particular one of the number of options at a particular one of the number of interactive areas;

update the GUI to reflect the selected one of the number of options; and if the selected one of the number of options is associated with one of the resistance levels, electronically transmit instructions to the resistance device to adjust a provided resistance level in accordance with the selected one of the resistance levels.

17. The rowing machine of claim 16 wherein:

said executable software instructions stored at said one or more electronic storage devices, when executed, configure the one or more processors to cause movement of the cursor at the GUI in response to the received user input in an unrestricted manner within an entirety of the GUI for pointing to, pointing between, and selecting various graphically displayed icons within the GUI.

18. The rowing machine of claim 16 wherein:

the touch pad is located at a middle portion of the handle; and the touch pad is wirelessly connected to the one or more processors.

19. The rowing machine of claim 16 wherein:

the number of options comprise a venue, a type of workout, and a time.

20. The rowing machine of claim 19 wherein:

at least a second portion of said number of options are associated with the video content for the display area; and the one or more electronic storage devices comprise additional executable software instructions, which when executed, configure the one or more processors to, if the selected option is associated with one of the second portion of said number of options, change the video content displayed at the display area in accordance with the selected one of the second portion of said number of options.

* * * * *